United States Patent [19]

Leigh-Monstevens

[11] Patent Number: 4,640,478

[45] Date of Patent: * Feb. 3, 1987

[54] QUICK CONNECT CYLINDER MOUNT STRUCTURE

[75] Inventor: Keith V. Leigh-Monstevens, Troy, Mich.

[73] Assignee: Automotive Products plc, Warwickshire, England

[*] Notice: The portion of the term of this patent subsequent to Dec. 18, 2001 has been disclaimed.

[21] Appl. No.: 641,054

[22] Filed: Aug. 15, 1984

Related U.S. Application Data

[63] Continuation-in-part of Ser. No. 387,019, Jun. 10, 1982, Pat. No. 4,488,701.

[51] Int. Cl.$^4$ ............................................. G12B 9/00
[52] U.S. Cl. ...................................... 248/27.1; 248/56
[58] Field of Search ................. 248/27.1, 56, 73, 637, 248/639, 220.2; 285/205, 192, 194, 196; 403/348, DIG. 4, 349; 24/594, 595

[56] References Cited

U.S. PATENT DOCUMENTS

| | | | |
|---|---|---|---|
| 2,047,838 | 7/1936 | Smith et al. | 248/637 X |
| 2,078,453 | 4/1937 | Miller | 248/56 |
| 2,723,876 | 11/1955 | Langlois et al. | 403/349 X |
| 2,948,141 | 8/1960 | Vahlstrom | 248/27.1 X |
| 3,146,010 | 8/1964 | Dellith | 248/27.1 X |
| 3,221,572 | 12/1965 | Swick | 248/56 X |
| 4,176,815 | 12/1979 | Davidson | 403/349 X |
| 4,488,701 | 12/1984 | Leigh-Monstevens | 248/637 |

Primary Examiner—Ramon S. Britts
Assistant Examiner—Sarah A. Lechok Eley
Attorney, Agent, or Firm—Krass & Young

[57] ABSTRACT

A structure for mounting a housing, such as the housing of a hydraulic cylinder, on a support plate or panel by a simple manual push-and-twist motion exerted on the housing and by the insertion of a spring clip between the housing and support plate. The support plate is provided, for example, with an opening defining a plurality of spaced-apart slots. The housing has a generally cylindrical mounting portion provided on one side with a circular flange of an outer diameter larger than the largest dimension of the plate opening. The other side of the cylindrical housing mounting portion is provided, for example, with a plurality of radially projecting lugs dimensioned such as to pass freely through the slots of the plate opening. A plurality of spaced-apart, locking portions, extends between consecutive slots. Each locking portion has a notch and each notch has sidewall abutment surfaces. After passage of the lugs through the slots of the plate opening, the protruding locking portions permit the lugs of the housing to be rotated a limited distance in a single direction within the mounting opening. The abutment surfaces of the locking portions block further rotation of the housing at a predetermined position wherein the lugs are in alignment with the notches. The spring clip is preferably U-shaped in configuration. The clip is thus insertable between the circular flange of the cylindrical housing mounting portion and the plate, thereby exerting a bias on the housing which urges the lugs in engagement within the notches.

6 Claims, 8 Drawing Figures

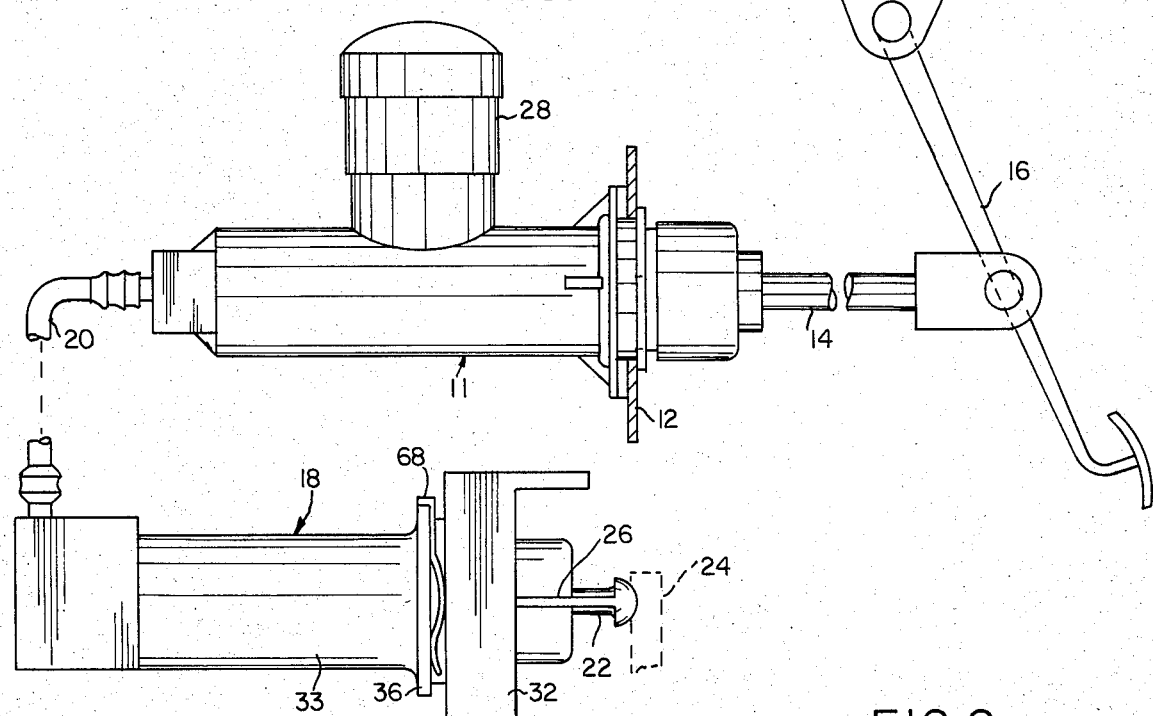
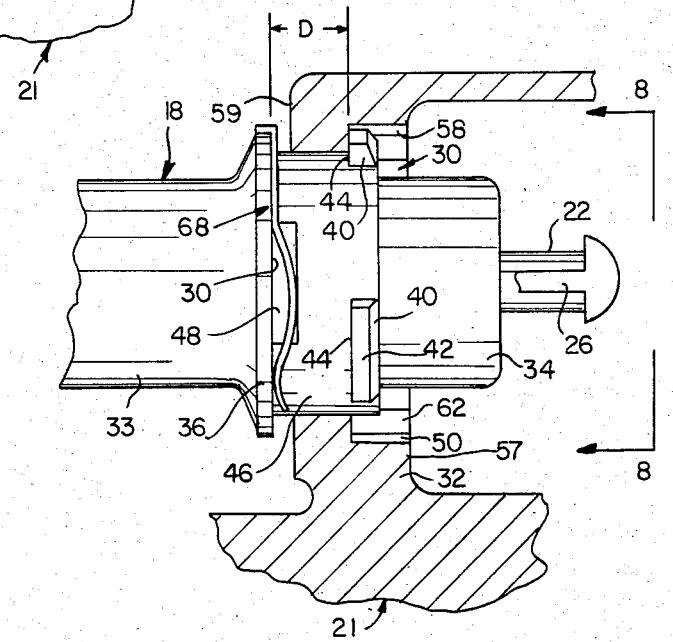
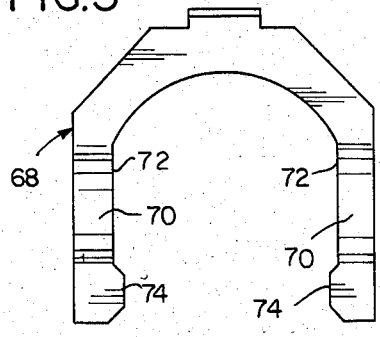
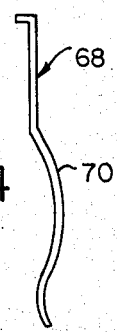

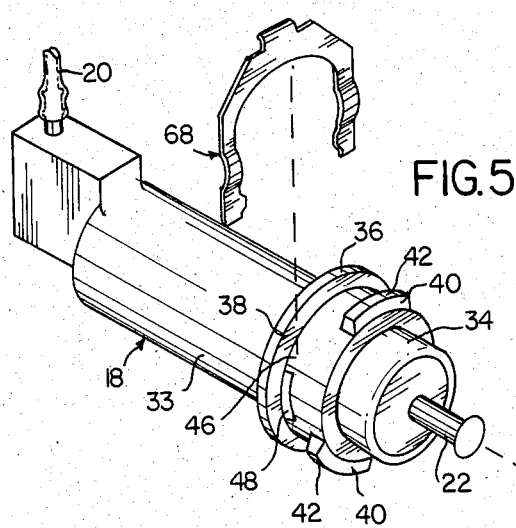
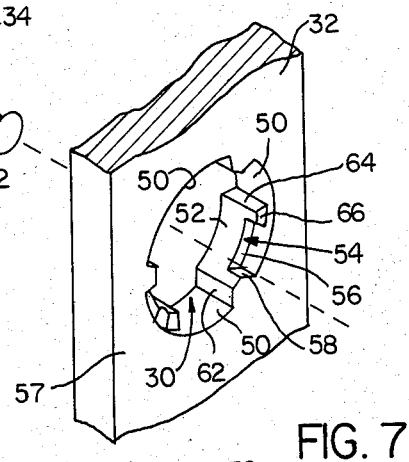
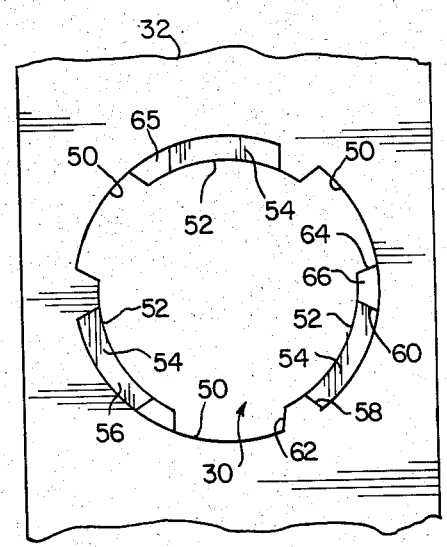
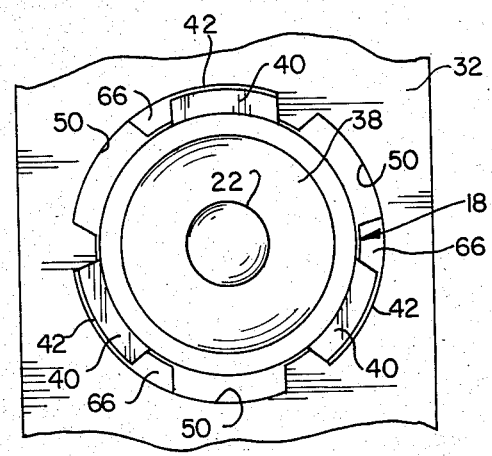

QUICK CONNECT CYLINDER MOUNT STRUCTURE

CROSS-REFERENCE TO RELATED APPLICATION

This application is a contination-in-part of application Ser. No. 387,019, filed June 10, 1982, now U.S. Pat. No. 4,488,701.

BACKGROUND OF THE INVENTION

The present invention relates to hydraulic cylinder apparatus in general and more particularly to a structure for mounting the housing of a hydraulic cylinder or other actuator on a support plate, with a portion of said cylinder projecting through the support plate.

The invention relates more specifically to apparatus such as hydraulic actuator apparatus capable of operating a mechanism at a remote location by way of, for example, a master cylinder connected to a slave cylinder installed at the remote location, a flexible conduit interconnecting the master cylinder and the slave cylinder. It is known to provide such hydraulic actuator apparatus for actuating, for instance, the release mechanism of a friction clutch. In British patent specification No. 1,539,879, and in corresponding U.S. Pat. No. 4,407,125 and U.S. Pat. No. 4,454,632, for example, there are disclosed preassembled friction clutch hydraulic control apparatus, which are prefilled with hydraulic fluid prior to shipment to a motor vehicle manufacturer for installation on a motor vehicle.

For the purpose of installing such apparatus on a motor vehicle, both the master cylinder and the slave cylinder are provided with a mounting flange integrally cast or molded with the cylinder housing and disposed peripherally to the cylinder housing at some intermediary location between the ends of the housing. The mounting flange has mounting holes, or is provided with ears or lugs having mounting holes, for installation of the cylinder on a support plate or panel, or on a support bracket. The master cylinder is generally installed by being mounted in an opening in a bulkhead, such as the vehicle floorboard, with an end of the cylinder housing projecting on one side of the bulkhead and the other end of the housing projecting on the other side of the bulkhead. The bulkhead is provided with a plurality of mounting holes disposed around the periphery of the opening. The mounting holes in the flange of the cylinder housing, or in the mounting lugs, must be aligned with the mounting holes in the bulkhead or floorboard, and the cylinder housing securely attached in position by means of appropriate bolts, or other fasteners, passed through the aligned mounting holes. Similarly, the slave cylinder is generally supported through an opening in the clutch housing itself, or on a lug or bracket attached to the clutch housing or integrally cast with the clutch housing. The slave cylinder housing is attached in position by way of bolts passed through aligned mounting holes in the clutch housing or bracket and in the cylinder housing mounting flange or lugs.

Other mounting arrangements for master and slave cylinders have been developed in the past for simplifying the installation of such hydraulic apparatus on the assembly line of a motor vehicle manufacturer, as disclosed for example in the aforesaid British patent specification, in the form of a snap ring retainer for the slave cylinder and of a push-and-rotate fastening arrangement for the master cylinder. The master cylinder is mounted through a square opening in the bulkhead. The housing of the master cylinder is provided with a substantially square flange spaced apart from a circular flange. The square flange is of a size permitting passage thereof through the square opening in the bulkhead. A resilient gasket is installed between the two flanges and is compressed when the square flange is pushed through the square opening in the bulkhead and the housing rotated approximately 45° around its longitudinal axis, thus causing the tips of the square flange to engage the rear surface of the bulkhead proximate the square opening and hold the cylinder housing in position, in view of the diagonal of the square flange having a length greater than the distance between opposite sides of the square opening. However, in such an arrangement, only frictional forces resulting from the compression of the resilient gasket, and causing engagement of the square flange tip surface with the corresponding surface of the bulkhead, prevent rotation of the master cylinder housing relative to the square mounting opening, as no other positive lock is provided.

In co-pending application Ser. No. 387,019, now U.S. Pat. No. 4,488,701, there is disclosed a simple, fast and foolproof mount structure of the "twist and lock" type for installing a housing, such as the housing of a hydraulic cylinder, in a mounting aperture in a bulkhead or support plate, requiring no tool or conventional fasteners for mounting the housing in position, and requiring simply introduction of the housing through a mounting aperture, followed by rotation of the housing while applying light longitudinal pressure to compress a resilient gasket for irreversibly locking the housing in position.

SUMMARY OF THE INVENTION

The present invention also provides a simple rapid and foolproof mount structure for installing the housing of a hydraulic cylinder in a mounting aperture in a bulkhead or support plate also of the "twist and lock" type, requiring no tool or conventional fasteners, which does not require the use of a resilient gasket, and which does not require rotating the housing past an over-center position or applying a torque force to the housing to overcome a detent.

The many objects and advantages of the present invention will become apparent to those skilled in the art when the following description of the best mode contemplated for practicing the invention is read in conjunction with the accompanying drawing wherein:

BRIEF DESCRIPTION OF THE DRAWING

FIG. 1 represents, in conjunction with a hydraulic apparatus in the form of a friction clutch hydraulic release mechanism, an example of structure according to the present invention for mounting a cylinder, such as the slave cylinder for example, through a support plate;

FIG. 2 is a partial view, showing the slave cylinder introduced through a mounting opening in a support plate;

FIGS. 3 and 4 are respectively elevation and side views of an example of structure for a retaining clip according to the invention;

FIG. 5 is an exploded perspective view of a hydraulic cylinder and corresponding mounting plate with a mounting opening according to the present invention;

FIG. 6 is a front elevation view of the mounting plate;

FIG. 7 is a front elevation view of the mounting plate showing the cylinder being introduced through the opening in the mounting plate; and FIG. 8 is a view of the mounting plate with the cylinder installed through the opening in the mounting plate, as seen from line 8—8 of FIG. 2.

DETAILED DESCRIPTION OF THE PREFERRED EMBODIMENT

Referring to the drawing, and more particularly to FIG. 1, there is illustrated a hydraulic apparatus 10 in the exemplary form of a master cylinder 11 mounted through the bulkhead 12 of a motor vehicle. The master cylinder 11 has an input piston rod 14 mechanically and pivotally connected to a clutch release pedal arm 16 for actuation by the motor vehicle driver. The master cylinder 11 is connected to a slave cylinder 18 by an appropriate conduit, preferably in the form of a flexible hose 20. The slave cylinder 18 is mounted in an appropriate position proximate to, on, or through the motor vehicle clutch housing 21 is such manner that its output rod 22 operates the clutch release mechanism, such as a clutch release lever 24. In the example of structure illustrated, the output rod 22 of the slave cylinder 18 is restrained during shipment of the hydraulic apparatus 10 to a motor vehicle manufacturer, and during installation of the apparatus on the motor vehicle assembly line, by a break-away retaining strap 26 of the type, for example, disclosed in U.S. Pat. No. 4,454,632 assigned to the same assignee as the present application.

Prior to shipment to the motor vehicle manufacturer, the clutch release hydraulic apparatus 10 is assembled as a complete unit, including the flexible hose 20 interconnecting the master cylinder 11 and the slave cylinder 18 and the slave cylinder output rod retaining strap 26. The apparatus 10 is installed on the motor vehicle on the assembly line as a ready-to-function unit. Prior to shipment, the hydraulic apparatus 10 is prefilled with hydraulic fluid, including filling a reservoir of hydraulic fluid which, in some structures, is a separate remotely located reservoir connected to the master cylinder 11 by a flexible hose but which, in the example of structure illustrated, is a hydraulic fluid reservoir 28 formed integrally with the housing of the master cylinder 11. Both the housing of the slave cylinder 18 and the housing of the master cylinder 11 may be cast of metal or, preferably, they are molded of plastic.

The master cylinder 11 is installed through the motor vehicle bulkhead or floorboard 12, with its end portion from which project the input rod 14 disposed within the driver's compartment. The structure for attaching the master cylinder 11 through the motor vehicle bulkhead or floorboard 12 may consist of a conventional mounting flange provided on the housing of the master cylinder 11, aligned mounting holes in the mounting flange and the bulkhead or floorboard, and a nut and bolt fastening arrangement, the bolts being passed through the aligned holes. Preferably, the mounting arrangement is the "twist and lock" mount disclosed in co-pending application Ser. No. 387,019, now U.S. Pat. No. 4,488,701. The slave cylinder 18 is mounted, in the example of structure illustrated, through an opening 30 in the clutch bell housing 21, a portion of the clutch bell housing 21 defining a mounting plate 32 provided with mounting aperture 30. The housing 33 of the slave cylinder 18 is provided proximate its end, protected by an elastomeric boot 34 through which project the output rod 22, with an integral circular flange 36 having a flat annular face 38 of a diameter larger than the widest dimension of the opening 30 in the mounting plate 32. A plurality of ears or lugs 40 are outwardly and radially disposed, cast integral with the housing of the slave cylinder 18. There are three lugs 40, in the example of structure illustrated, each having a circular tip 42 and a flat partially annular rear surface 44 located at a predetermined distance D from the flange annular surface 38. The housing 33 of the slave cylinder 18 has a generally cylindrical portion 46, and a pair of diametrically opposed planar recessed portions 48, FIGS. 2 and 5. The mounting plate aperture 30, as best shown at FIGS. 5-6 has three cylindrical segments or slots 50 of a radius and width accommodating the cylinder housing lugs 40 and three projecting cylindrical stepped segments 52 accepting the cylindrical body portion 46 of the slave cylinder housing 33. The mounting opening 30 further comprises three notches or recesses 54 extending over an arc of a circle and having a width accommodating the width of the cylinder housing lugs 40. Each notch or recess 54 has a partially annular bottom surface 56 substantially parallel to the mutually parallel front and rear surfaces 57 and 59 of the mounting plate 32, i.e. in a plane substantially perpendicular to the axis of the opening 30. An abutment sidewall 58 extends from each surface 56 to the front surface 57 of the mounting plate 32 and an abutment sidewall 60 extends from each surface 56 to part of the way towards the front surface 57 of the mounting plate 32. The junctions between the cylindrical slots 50 and the cylindrical stepped segments 52 form respectively and abutment wall 62 that extends all the way from one surface 57 of the mounting plate 32 to the other surface 59, and an abutment wall 64 that extends from the rear surface 59 of the mounting plate 32 to a ledge 66 at the end of the abutment wall 64 proximate the front surface 57 of the mounting plate 32, the length of the abutment wall 64 being substantially equal to, or slightly less than, the distance D between the lugs rear surface 44 and the flange annular face 38.

The housing 33 of the slave cylinder 18 is mounted through the opening 30 simply by being pushed through the opening with the lugs 40 passing through the cylindrical segment or slots 50 of the opening. FIG. 7, until the annular surface 38 of the flange 36 engages the rear surface of the mounting plate 32, followed by clockwise rotation of the cylinder 18, FIGS. 7 and 8 until the side of each lug 40 abuts against the abutment sidewall 58 of the notches or recesses 54. Because the length of the abutment wall 64, i.e. the distance separating the ledge 66 of the abutment wall 64 from the rear surface 59 of the mounting plate 32 is equal to or less than the distance D separating the partially annular rear face 44 of the lugs 40 from the annular face 38 of the housing flange 36, clockwise rotation of the cylinder 18, with the annular face 38 of the flange 36 applied against the rear surface 39 of the mounting plate 32, is allowed in view of the rear face 44 of the lugs 40 clearing the ledges 66 of the abutment walls 64. Rotation of the cylinder 18 in an opposite direction is prevented by the other side of the lugs 40 engaging the abutment walls 62.

Once the cylinder 18 has been rotated to the position illustrated at FIG. 8, with one side of the cylinder housing lugs 40 abutting against the sidewall 58 of the notches or recesses 54, a retainer spring clip 68, FIGS. 2-5, is manually pushed between the rear surface 59 of the mounting plate 32 and the annular face 38 of the cylinder housing flange 36. As best shown at FIG. 3, the spring clip 68, which is made of spring steel or resilient plastic, is substantially U-shaped and is provided with a pair of integral substantially parallel bowed legs 70. The distance separating the inner edges 72 of the clip legs 70 is less than the diameter of the cylinder housing cylindrical portion 46 fitting within the mounting opening 30, such that each inner edge 72 of the legs 70 engages a recessed flat surface 48. The bowed legs 70 are provided at their free end with an inwardly projecting portion 74, the projecting portions 74 being separated by a distance which is slightly less than the distance separating the two opposite recessed flat surfaces 48, with the result that when the clip 68 is engaged, as illustrated at FIG. 2, the legs 70 are caused to spread apart, elastically, slightly while they pass over the recessed flat surfaces 48, and elastically return to their original position, such as to hold the clip 68 in position, with the inwardly projecting portions 74 interfering against accidental removal of the clip 68. The bow of the legs 70 causes the lugs 42 to be elastically retained with their partially annular flat rear face 44 in engagement with the bottom surface 56 of the notches or recesses 54 in the mounting opening 30, thus locking the cylinder housing 33 securely fastened through the mounting opening 30 in the support plate 32, as the only force applied upon the housing 33 of the cylinder 18 during operation of the slave cylinder 18 is the reaction force resulting from extension of the output member 22 for operating a clutch release mechanism such as the lever arm 24, FIG. 1. The reaction force is directed longitudinally in the direction that tends to engage the cylinder housing mounting lugs 40 more firmly against the bottom surface 56 of the notches or recesses 54.

It will be appreciated by those skilled in the art that the clip 68, which is easily insertable manually between the annular face 38 of the cylinder flange 36 and the rear surface 59 of the mounting or support plate 32, and which provides a spring bias holding the lugs 40 constantly in engagement with the bottom surface 56 of the mounting recesses or notches 54, thus resulting in a substantially rattle-proof mounting of the cylinder 18, may be replaced by an appropriate spacer, incompressible or preferably compressible. A resilient gasket may also be used, permanently installed on the annular face 38 of the flange 36, which in turn requires that sufficient force be exerted longitudinally on the cylinder housing 33 to compress the gasket to allow the lugs 40 to pass over the projecting ledges 66, on the lower side of the recesses or notches 54. Compression of such a resilient gasket is aided by cutting the end of the abutment walls 64, proximate the ledges 66, at an angle, such as to form a ramp engageable with the side of the lugs 40 to aid in compressing the resilient gasket during rotation of the cylinder housing 33. Also, it will be appreciated that the spring clip 68 may be installed prior to installing the cylinder through the opening in the mounting plate, which in turn requires that the bowed legs 70 of the clip be elastically flattened by moving the cylinder housing 33 longitudinally while rotating it to lock it in position in the mounting opening 30.

Having thus described the present invention by way of an example of structure, given for illustrative purpose only, which is well designed for accomplishing the objects of the invention, modifications whereof will be apparent to those skilled in the art, what is claimed as new is as follows:

1. A mounting structure coupling a hydraulic cylinder housing to a support plate, said housing having a generally cylindrical peripheral surface portion and a substantially circular flange at one side of said generally cylindrical peripheral surface portion, said mounting structure comprising at least a pair of symmetrically disposed radially projecting lugs at the other side of said generally cylindrical peripheral portion, a mounting opening in said support plate, said mounting opening having a cylindrical portion of a diameter conforming to said housing generally cylindrical portion extending from one face of said support plate to the other face of said support plate, and a cylindrical cut-out portion conforming to the perimeter of said lugs extending from said one face of said support plate to said other face, notched recesses of a perimeter conforming to the perimeter of said lugs extending from said other face of said support plate to a predetermined depth in said cylindrical portion of said mounting opening, each of said notched recesses being adapted to receive one of said lugs between two lateral abutment walls of said notched recesses, the first of said abutment walls extending to said other face of said support plate and the second of said abutment walls extending part of the way to said other face, whereby rotation of said housing in one direction after introduction of said lugs and cylindrical peripheral portion through said mounting opening is prevented by the first of said abutment walls extending all the way to the other face of said support plate and rotation of said housing in an opposite direction is enabled by passage of said lugs over the second of said abutment walls extending part of the way to said other face of said support plate, each first of said abutment walls preventing rotation of said lugs beyond said notched recesses, and spacer means disposed between said housing circular flange and said one face of said support plate for drawing each of said lugs within one of said notched recesses.

2. The mounting structure of claim 1 wherein said spacer means comprises spring bias means.

3. The mounting structure of claim 2 wherein said spring bias means is a generally U-shaped spring clip having a pair of generally parallel legs bowed to an appropriate extent for causing a spring force urging apart said housing flange and said one face of said support plate.

4. The mounting structure of claim 1 wherein said hydraulic cylinder is the slave cylinder of a motor vehicle clutch hydraulic release apparatus.

5. The mounting structure of claim 2 wherein said hydraulic cylinder is the slave cylinder of a motor vehicle clutch hydraulic release apparatus.

6. The mounting structure of claim 3 wherein said hydraulic cylinder is the slave cylinder of a motor vehicle clutch hydraulic release apparatus.

* * * * *